United States Patent [19]

Bauer

[11] 4,257,163

[45] Mar. 24, 1981

[54] AUTOMOTIVE SERVICE TOOL

[76] Inventor: Wolfgang Bauer, 19 Pine Ct., Dowling, Ontario, Canada

[21] Appl. No.: 34,180

[22] Filed: Apr. 27, 1979

[51] Int. Cl.³ .................. B26B 17/00; B23P 19/04
[52] U.S. Cl. ..................................... 30/180; 29/252; 29/260; 29/263; 30/241
[58] Field of Search .................. 29/252, 256–264; 30/168, 180, 241

[56]  References Cited
U.S. PATENT DOCUMENTS

| 1,498,638 | 6/1924 | Periolat | 29/257 X |
| 2,490,284 | 12/1949 | Simart | 29/252 |
| 3,339,263 | 9/1967 | Dodge | 29/252 |
| 3,495,330 | 2/1970 | Bruce | 30/180 |
| 4,083,111 | 4/1978 | Kerins | 30/168 |

FOREIGN PATENT DOCUMENTS 1122008  1/1962  Fed. Rep. of Germany ............ 29/259

Primary Examiner—Robert C. Watson
Attorney, Agent, or Firm—George A. Rolston; William F. Frank

[57] ABSTRACT

A multi-function hydraulic tool especially intended for use in automobile servicing operations comprises a hydraulic cylinder housing a piston. At least one arm is secured to the outside of the cylinder and projects axially therefrom. A seating is secured to the arm forwardly of the open end of the cylinder so as to support one member when axial force is applied by the piston to a different cooperating member so as to cause relative movement of such members. The tool can be used for a variety of purposes, for example, for removing a bearing from a shaft and its arm is usefully releasably secured to the cylinder.

19 Claims, 16 Drawing Figures

AUTOMOTIVE SERVICE TOOL

BACKGROUND OF THE INVENTION

The present invention relates generally to a hydraulic tool and more particularly to a multi-function hydraulic tool especially intended for use in the servicing of automobiles and other motor vehicles.

During the servicing of automobile vehicles, it is often necessary to remove the tapered bolts or shafts of ball joint assemblies from the mounting arms through which such shafts extend. In dissembling such ball joints, it is generally also necessary to remove the nut from the threaded end of such a shaft. Frequently, such nuts are firmly rusted in position and can not be removed by unscrewing and, therefore, have to be removed by splitting. While manually operated nut splitters can be used for such a purpose, such use of those tools is somewhat time-consuming and, therefore, increases the labour cost of the vehicle repair.

While various tools have hereinbefore been suggested for the press removal of the tapered shafts or ball joint assemblies, such previously proposed tools have presented certain practical disadvantages. For example, some of the known tools have been quite difficult to use while others have been relatively complex in their construction and consequently so expensive that their use has not been widely accepted.

In other automotive servicing operations, it is necessary to fit male members into female members and female members onto male members. Other servicing operations require the removal of female members from male members.

It is a principal object of this invention to provide a multi-function hydraulic tool which can be used in many such automotive servicing operations as well as for splitting nuts.

It is a further object of this invention to provide a multi-function hydraulic tool for the aforesaid purposes and which tool is relatively simple in its construction and, therefore, relatively inexpensive to manufacture.

Other objects of the invention will become apparent as the description herein proceeds.

SUMMARY OF THE INVENTION

Broadly, this invention provides a multi-function hydraulic tool which comprises a hydraulic cylinder having a peripheral wall, an open end and a closed end; a piston having an outer end and slidably mounted in said cylinder for movement in an axial direction between extended and retracted positions thereof; a port in fluid communication with the interior of said cylinder for the supply thereinto of a hydraulic fluid under pressure to cause outward movement of said piston through said open end of said cylinder toward said extended position thereof and for the discharge of such hydraulic fluid from within said cylinder on movement of said piston axially into said cylinder toward said retracted position thereof; at least one arm secured to said cylinder and projecting axially beyond said open end thereof; and a seating secured to said arm in axially spaced apart position relative to said open end of said cylinder for supporting a first member when terminal pressure is applied by said piston against a cooperating second member so in turn to cause relative movement of said first and second members.

Such a tool as broadly provided by this invention can, for example, be used for applying axial pressure to the end of a male member while a cooperating female member is supported on the seating of the tool. Such application of axial pressure can be used for the press removal of such a male member from such a female member or for the press insertion of a male member into a female member.

Usefully a tool in accordance with this invention is provided with two said arms which are secured, preferably releasably, to the cylinder of the tool in peripherally spaced apart positions, which project axially beyond the open end of the cylinder and which are both secured to the seating of the tool. Usefully, such two arms are disposed diametrically opposite to each other.

When intended for use in dismantling automobile ball joints, the seating of a tool in accordance with this invention usefully has a semi-circular annular configuration with generally transverse inner and outer faces, the former opposing the open end of the cylinder.

In a tool in accordance with this invention, a blind bore in usefully formed in the outer end of the piston of the tool for removably receiving a mating stud of a thrust plate. The use of such a thrust plate is desirable in that it prevents damage to the piston itself during use of the tool and such a thrust plate can be replaced when worn.

In order to permit the use of a tool in accordance with this invention as a hydraulic nut-splitter, such a tool is usefully provided with an anvil plate which can be supported on the inner surface of the seating of the tool and with a wedge-shaped splitting tool having a cutting edge facing that anvil plate and a guide stud slidably received in the aforementioned blind bore in the outer end of the piston of the tool. By supporting a nut which cannot be unscrewed from a bolt so that it is supported by one of its peripheral faces on the anvil plate, the tool can be operated to press the cutting edge of the splitting tool against an opposed edge face of the nut with eventual splitting of the nut. Alternatively, such a nut can be supported by one of its major faces on an annular anvil plate so that the cutting edges of a hollow splitting tool disposed in the end of the piston engage the other major face of such a nut on opposite sides of a bolt projecting therethrough.

Various arrangements of arms and seatings are possible for a hydraulic tool in accordance with this invention are possible and some typical arrangements for such members are shown in the accompanying drawings.

BRIEF DESCRIPTION OF THE DRAWINGS

The invention will now be described merely by way of illustration with reference to the accompanying drawings, in which:

The several figures of the drawings are located on the appended sheets of drawings as follows:
Sheet #1: FIGS. 1, 3 and 4;
Sheet #2: FIGS. 2, 6 and 8;
Sheet #3: FIGS. 5, 9, 10 and 12;
Sheet #4: FIGS. 7, 13 and 16, and,
Sheet #5: FIGS. 11, 14 and 15.

DESCRIPTION OF THE PREFERRED EMBODIMENTS

Figure 1:
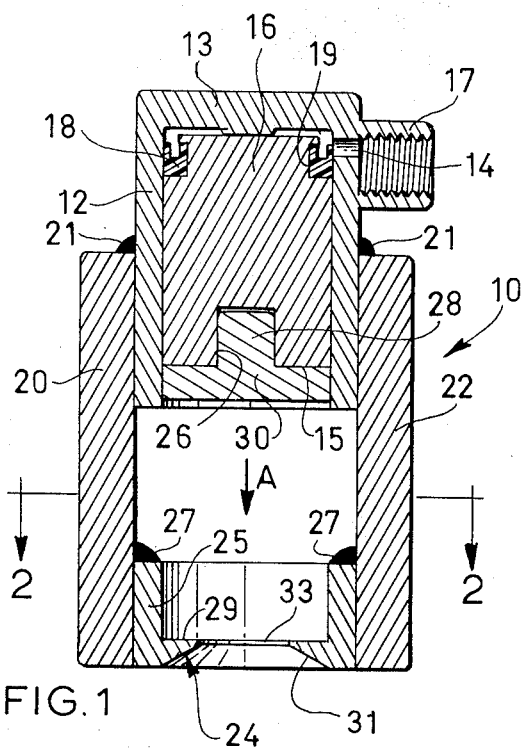
FIG. 1 is an axial sectional view through one embodiment of a multi-function hydraulic tool in accordance with this invention and showing a piston thereof in its retracted position.

Reference will first be made to FIG. 1 in which there is indicated generally by the legend 10 one embodiment of a multi-function hydraulic tool in accordance with this invention.

The tool 10 comprises a generally right cylindrical hollow cylinder 12 having an upper closed end 13. A solid cylindrical piston 16 having an outer end 15 is slidably mounted in the cylinder 12 for movement from the retracted position shown in FIG. 1 in the direction of the arrow A into an extended position. An annular piston ring 18 having a generally U-shaped sectional configuration is provided in a groove 19 formed peripherally in the piston 16 at its upper or inner end. It will, of course, be appreciated that the invention is in no way restricted to the use of any particular form of piston ring, which ring is merely provided in a conventional manner to ensure a hydraulic seal between the piston 16 and the cylinder 12.

A port 14 is provided in the wall of the cylinder 12 for the supply of hydraulic fluid under pressure into that cylinder to cause downward or outward movement of the piston 16 toward its extended position and for the discharge of such hydraulic fluid from that cylinder 12 on upward or inward movement of that piston 16 toward its retracted position.

In the accompanying drawings, the port 14 is shown as being provided with an internally threaded sleeve 17 for attachment of a hydraulic hose (not shown).

Two elongated arms 20 and 22 are secured to the outer surface of the cylindrical wall of the cylinder 12 in diametrically opposed positions, for example, by welding as partially indicated at 21. The arms 20, 22 extend downwardly from the cylinder 12 beyond the lower open end thereof and, at their lower ends, are secured, for example, by welding to a semi-circular annular seating or ring generally indicated at 24.

In the particular embodiment illustrated in FIGS. 1 to 4, the ring 24 is integrally formed with an upstanding semi-cylindrical member 25 which is welded at 27 to the arms 20 and 22. With further reference to the ring 24, it will be seen that it has an upper or inner planar face 29 which is essentially perpendicular to the axial direction of movement of the piston 16 and a generally frusto-conical outer or under-surface 31 which tapers inwardly and upwardly. The generally semi-circular opening in the ring 24 is indicated by the legend 33.

Figure 3:
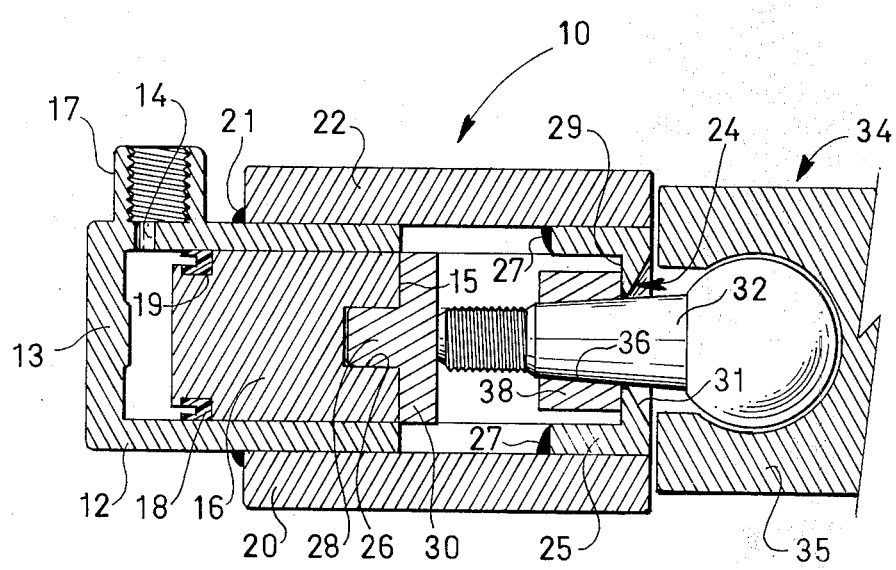
FIG. 3 is an axial sectional view similar to that of FIG. 1 and illustrating somewhat schematically the use of the tool for pressing the tapered bolt of an automobile ball joint assembly out of a mounting arm, the piston of the tool being shown partially extended.

Referring again to the piston 16, it will be noted from FIG. 1 that a generally axial blind bore 26 is formed in the outer end 15 of that piston. In FIGS. 1 and 3, a circular thrust plate 30 comprising an axial stud 28 which is removably received in the bore 26 is shown as being so fitted on the tool 10.

Having completed the description herein of the tool 10, the manner in which that tool is used to press a tapered bolt 32 of an automobile ball joint assembly generally indicated at 34 out of a bore 36 in a mounting arm 38 of such a ball joint assembly will now be considered with reference to FIG. 3 of the accompanying drawings. To effect such a removal, the mounting arm of such a ball joint assembly is placed so that it abuts the top or inner face 29 of the seating or ring 24. Hydraulic fluid is then introduced under pressure into the cylinder 12 through the port 14 having first positioned the thrust plate 30 on the lower end 15 of the piston 16. Such introduction of hydraulic fluid into the cylinder 12 causes the piston 16 to be extended in the direction of the arrow A against the end of the bolt 32 to force that bolt out of the bore 36.

The frusto-conical undersurface 31 of the ring 24 has in practice been found to be beneficial in that it facilitates the positioning of the tool with the ring 24 in the relatively limited space available in automobile ball and socket joints between the mounting arm 38 and the socket housing shown schematically at 35 in FIG. 3.

Reference will next be made herein to FIG. 4 of the accompanying drawings which shows the use of the tool 10 as a nut splitter. For such a purpose, the aforementioned thrust plate 30 is removed and replaced by a splitting tool generally indicated at 40 and having a wedge-shaped cutting head 41 and a stud 43 dimensioned so as to fit into the aforementioned bore 26 in the outer end of the piston 16. The cutting head 41 has a transverse cutting edge indicated by the legend 45.

Figure 4:
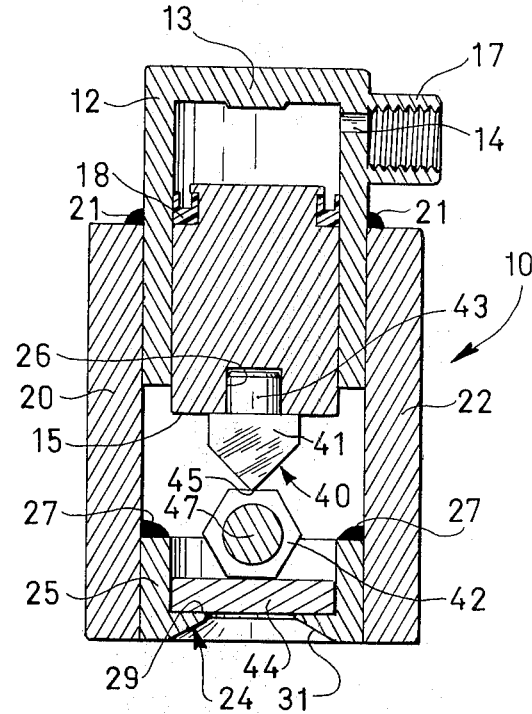
FIG. 4 is an axial sectional view similar to those of FIGS. 1 and 3 but showing the tool provided with a removable anvil plate and a splitting tool and in use as a nut-splitter.

To split a nut 42 for the purpose of removing it from a bolt 47, a generally semi-circular anvil plate 44 is positioned on the inner face 29 of the ring 24 for supporting the nut 42 as will readily be understood from FIG. 4. On the introduction of hydraulic fluid under pressure through the port 14 into the cylinder 12, the cutting head 41 is pressed down against the side of the nut 42 so to split that nut and allow it to be removed from the bolt 47.

While the use of the tool 10 has been specifically described with reference to FIG. 3 of the accompanying drawings with respect to its use for the press removal of the threaded bolt 32 from the mounting arm 38 of an automobile ball joint assembly 34, it will be understood that the tool will find application in many other situations where it is desired to press a male member out of a female member. Additionally, the tool 10 can be used for the press insertion of a male member into a female member.

Reference will next be made fo FIGS. 5, 6, 7 and 8 of the accompanying drawings in which there is indicated generally at 50 another embodiment of a multi-function hydraulic tool in accordance with this invention.

The tool 50 comprises a generally right cylindrical hollow cylindrical 51 having an upper closed end 52. The port 53 provided with an internally threaded sleeve 54 for the attachment of a hydraulic hose (not shown) is provided for the supply of hydraulic fluid into the cylinder 51 and for the discharge of such fluid therefrom.

Figure 6:
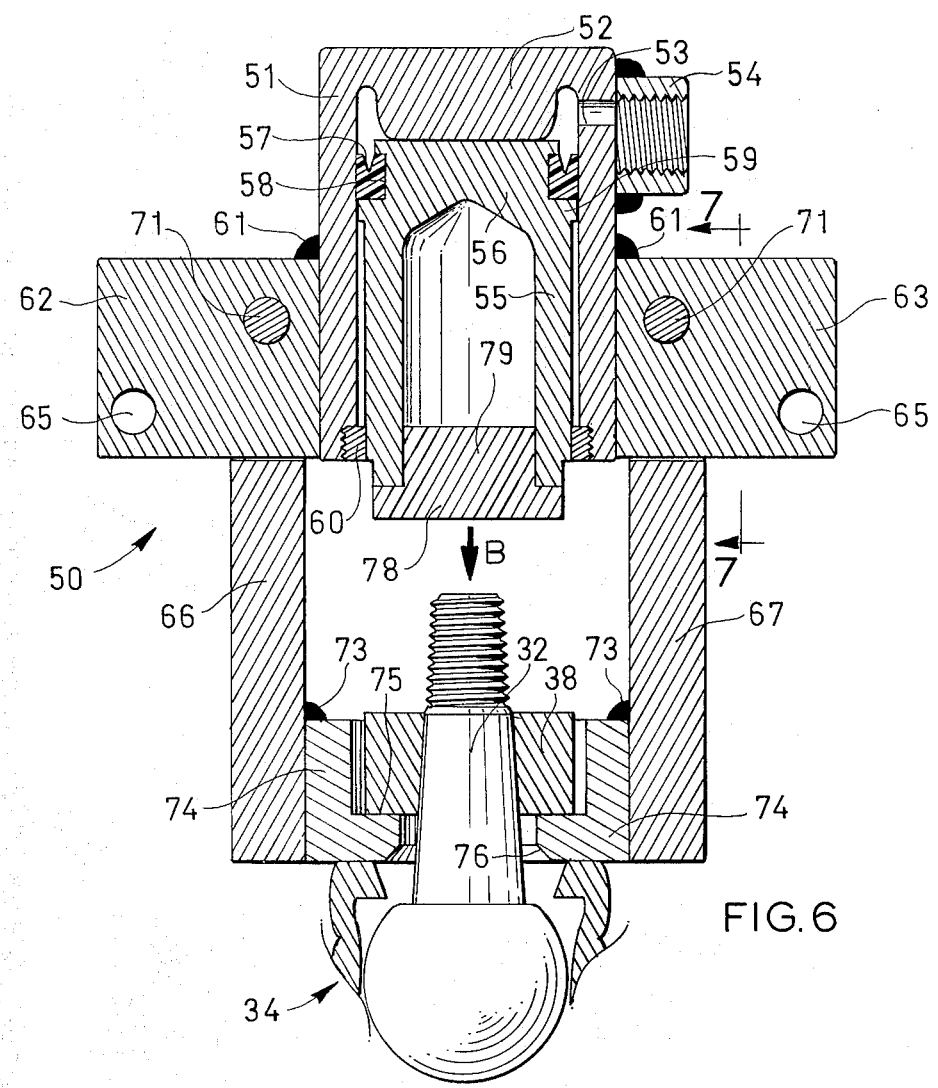
FIG. 6 is an axial sectional view through the tool shown in FIG. 5 when taken as indicated by the arrows 6—6 of that figure and showing, in a similar manner to FIG. 3, the use of the tool for pressing the bolt of an automobile ball joint assembly out of a mounting arm.
Figure 2:
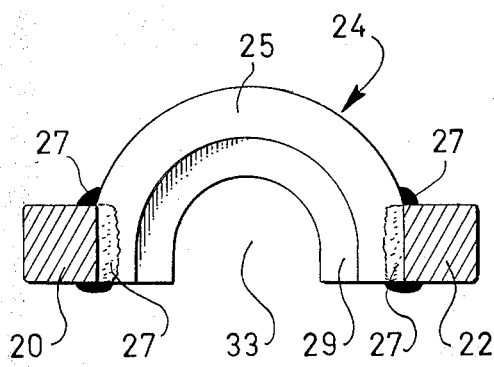
FIG. 2 is a transverse sectional view through the tool shown in FIG. 1 when taken as indicated by the arrows 2—2 of that Figure.
Figure 8:
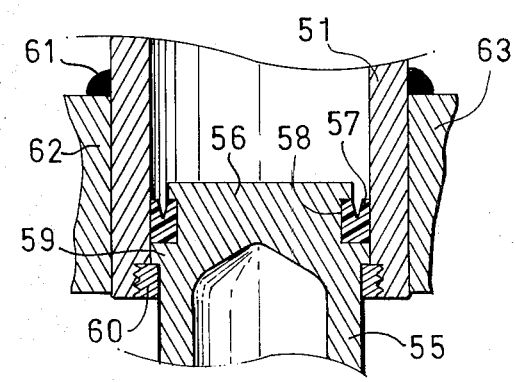
FIG. 8 is a fragmentary axial sectional view through the tool shown in FIGS. 5 and 6 with the piston of that tool in its fully extended position.

A hollow cylindrical piston 55 having an open lower end forming a blind bore 55a and an upper closed end 56 is slidably mounted in the cylinder 51 for movement from the retracted position shown in FIG. 6 in the direction of the arrow B into an extended position as shown in FIG. 8. A piston ring 57 is seated in a peripheral recess 58 provided at the upper or inner end of the piston 55. A radially outwardly projecting annular rib 59 is integrally formed with the piston 55 partially to provide the seating for the piston ring 57 and for sliding engagement with the cylinder wall 5. A threaded ring 60 removably screwed into the lower end of the cylinder 51 engages the rib 59 and constitutes a limit means so that when the piston is in its fully extended position as shown in FIG. 8, it prevents accidental expulsion of the piston 55 completely out of the cylinder 51.

Secured to the cylinder wall 51, for example, by welding as indicated at 61 are two diametrically opposed and radially extending arm-engaging means or ears 62 and 63. For a reason which will be more readily understood as the description herein proceeds, each of the ears 62 and 63 is formed with an inner and upper bore 64 as well as with an outer and lower bore 65 therethrough.

Figure 5:
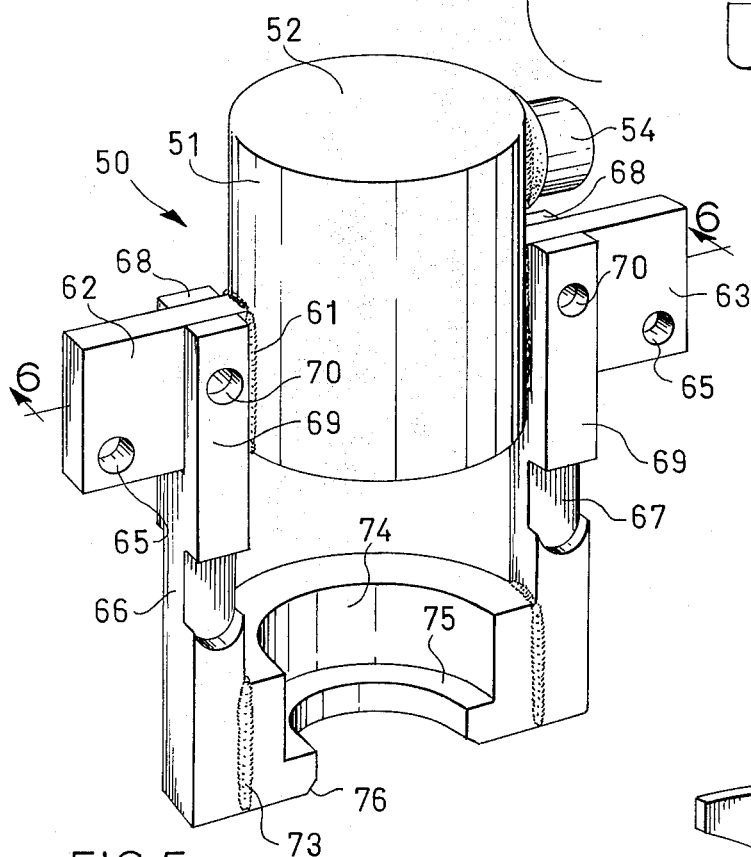
FIG. 5 is a perspective view of an alternate embodiment of a multi-function hydraulic tool in accordance with this invention.
Figure 7:
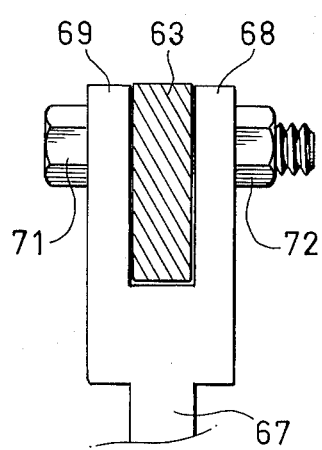
FIG. 7 is a fragmentary sectional view of a means for releasably securing an arm of the tool shown in FIGS. 5 and 6 on the cylinder (omitted from FIG. 7) of that tool, being taken as indicated by the arrows 7—7 of FIG. 6.

In FIGS. 5, 6 and 7 of the accompanying drawings, there are also shown first and second arms 66 and 67 respectively which are releasably secured to the ears 62 and 63. These arms 66 and 67 are bifurcated at their upper ends to provide separate limbs 68 and 69 between which respective ones of the ears 62 and 63 can be received, aligned bores 70 being provided in the limbs 68 and 69 for receiving fastening bolts 71 (FIGS. 6 and 7) for releasably fastening the arms 66 and 67 to the ears 62 and 63 respectively, such bolts then extending through the upper and inner bores 64 in those ears. Nuts 72 (FIG. 7) are utilized to prevent accidental disengagement.

At their lower ends, the arms 66 and 67 are secured, for example, by welding as indicated at 73 to a seating comprising a semi-cylindrical sleeve 74 which in turn is integrally formed with an essentially semi-circular member having a radially extending top surface 75 and an inwardly and upwardly sloping undersurface 76 as will readily be understood by reference to FIG. 5.

The tool 50 is shown in FIG. 6 in use for the press removal of a tapered bolt 32 from the mounting block 38 of the ball joint assembly 34. Since the tool 50 is used for such an operation in essentially the same manner as is the tool 10 and as already described herein, it is not considered to be necessary to describe such an operation in further detail herein. It should perhaps, however, be noted that, for such operation, a circular thrust plate 78 has its cylindrical locating stud 79 inserted into the open lower end 55a of the piston 55 as actually shown in FIG. 6.

Figure 9:
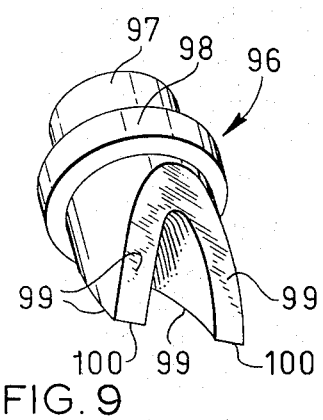
FIG. 9 is a perspective view of a splitting tool intended to be used with the hydraulic tool shown in FIGS. 5 and 6.
Figure 10:
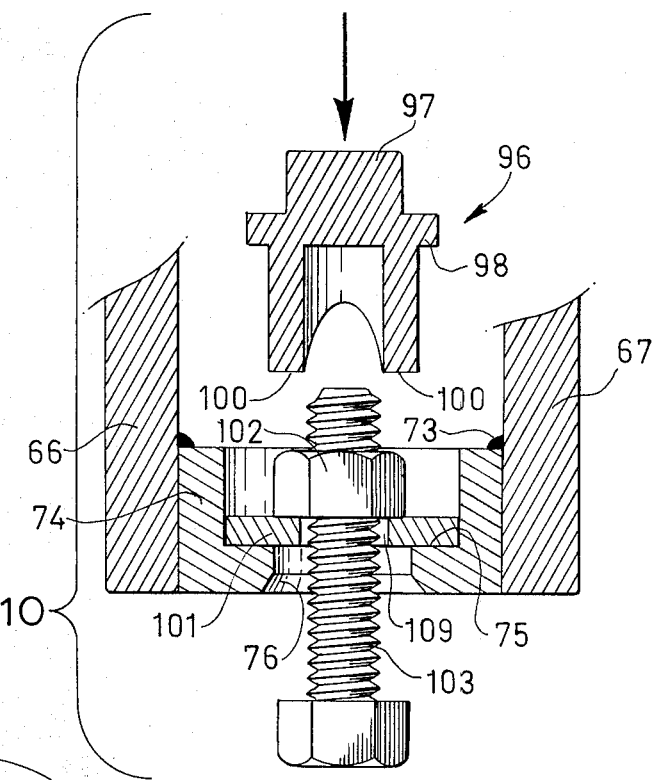
FIG. 10 is a fragmentary axial sectional view illustrating the manner in which the splitting tool shown in FIG. 9 is used with the hydraulic tool shown in FIGS. 5 and 6.

Reference will next be made herein to FIGS. 9 and 10 in which there is indicated generally at 96 an alternative form of nut-splitting tool intended to be used in the hydraulic tool 50 in the manner shown in FIG. 10. The tool 96 comprises a generally cylindrical locating stud 97 dimensioned so as to be received within the open lower end 55a of the piston 55 of the tool 50 and a larger integrally formed collar 98 which engages the lower end of the piston wall when the tool 96 is so disposed.

Below the collar 98, the tool 96 is integrally formed with a hollow cylindrical wall which is cut aback or chamfered as at 99 to provide two radially extending cutting edges 100. The tool 96 is intended to be used in conjunction with an annular supporting plate 101 which is itself supported on the top surface 75 of the seating so as then to support a nut 102 which is to be split by the tool 96 as will readily be understood by reference to FIG. 10. In such use, one major face of the nut 102 is supported on the plate 101 and the cutting edges 100 are forced downwardly against the other major face of that nut 102, the bolt 103 extending through the central aperture 109 of the plate 101.

Figure 12:
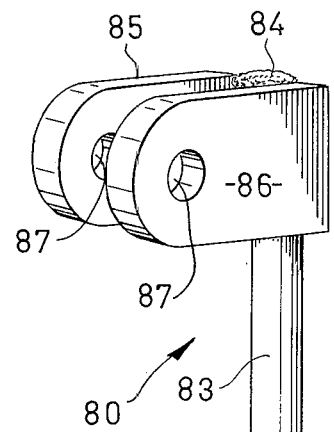
FIG. 12 is a perspective view of one of the alternative arms shown in FIG. 11.
Figure 11:
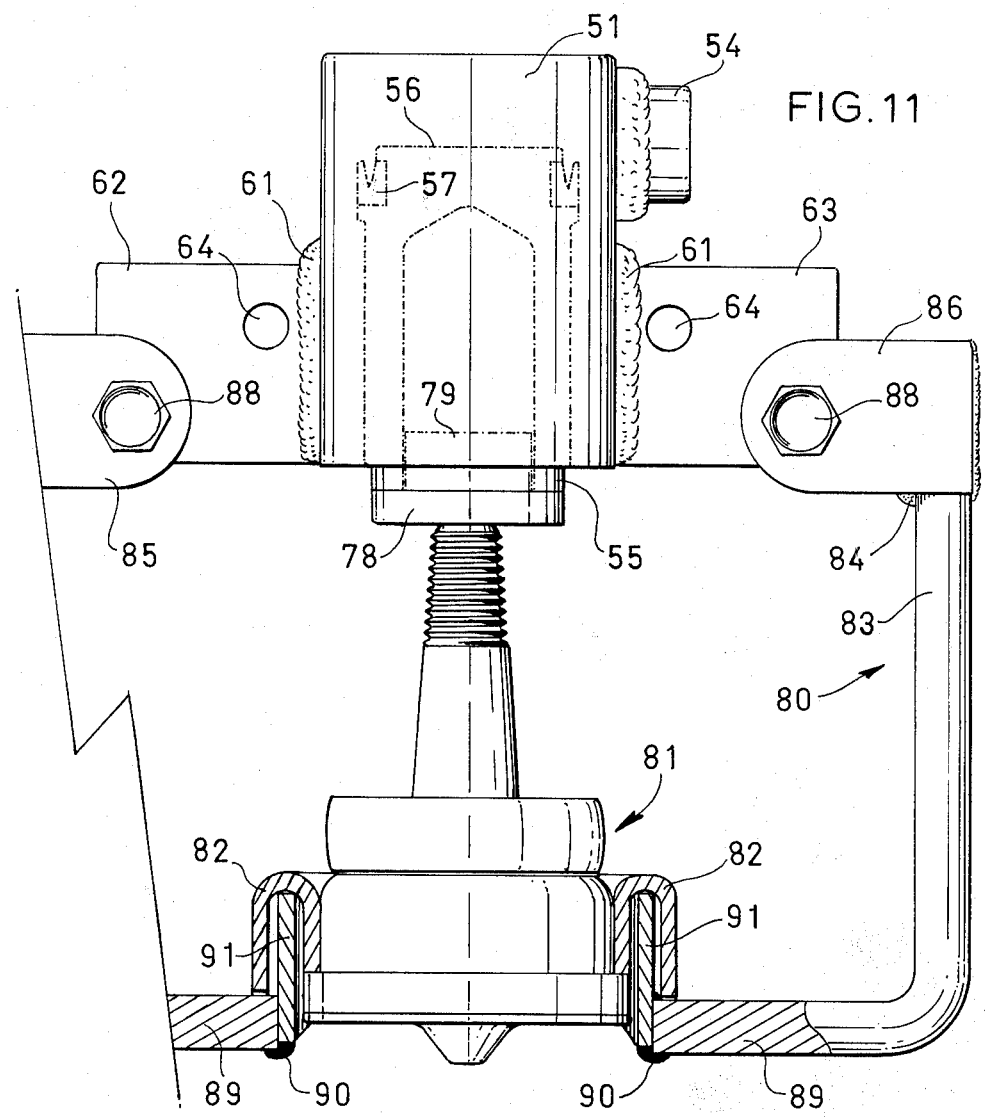
FIG. 11 is a somewhat schematic and fragmentary view partly in section illustrating the use of two alternative arms, with the tool shown in FIGS. 5 and 6 for pressing a ball joint housing out of a frame member.

Reference will next be made to FIGS. 11 and 12 of the accompanying drawings in which there is indicated generally and fragmentarily at 80 an alternative structure for the arms used with the tool 50 and particularly intended for use in pressing a ball joint housing 81 out of a supporting frame member 82.

Each of the two arm assemblies 80 as shown in FIG. 11 comprises an elongated rod 83 which is secured, for example, by welding as indicated at 84 at its upper end to two mutually spaced lugs 85 and 86 provided with aligned bores 87 to permit the arm assembly pivotally to be secured to a respective one of the ears 62 and 63 by means of a bolt 88 passing through the bores 87 and the outer and lower bore 65 in the respective one of the ears 62 and 63 as best shown in FIG. 11.

At its lower end, each rod 83 is bent inwardly at 89 and is terminally welded as indicated at 90 to a seating 91 comprising an arcuate wall portion having a top edge surface 92 disposed in a plane which extends radially with respect to the axis of the piston 55, an inner surface 93 generally coaxial with such axis and an undersurface 94 which tapers upwardly from a lowermost central position toward the outer ends of the top edge surface 92.

For use, the arms 80 are connected by the bolts 88 to respective ones of the ears 62 and 63 and those arms are then pivoted into position beneath the supporting frame members 82 as actually shown in FIG. 11. On the introduction of hydraulic fluid under pressure into the cylinder 51, the thrust plate 78 then causes the ball joint housing 81 to be pressed out of the frame member 82.

Figure 13:
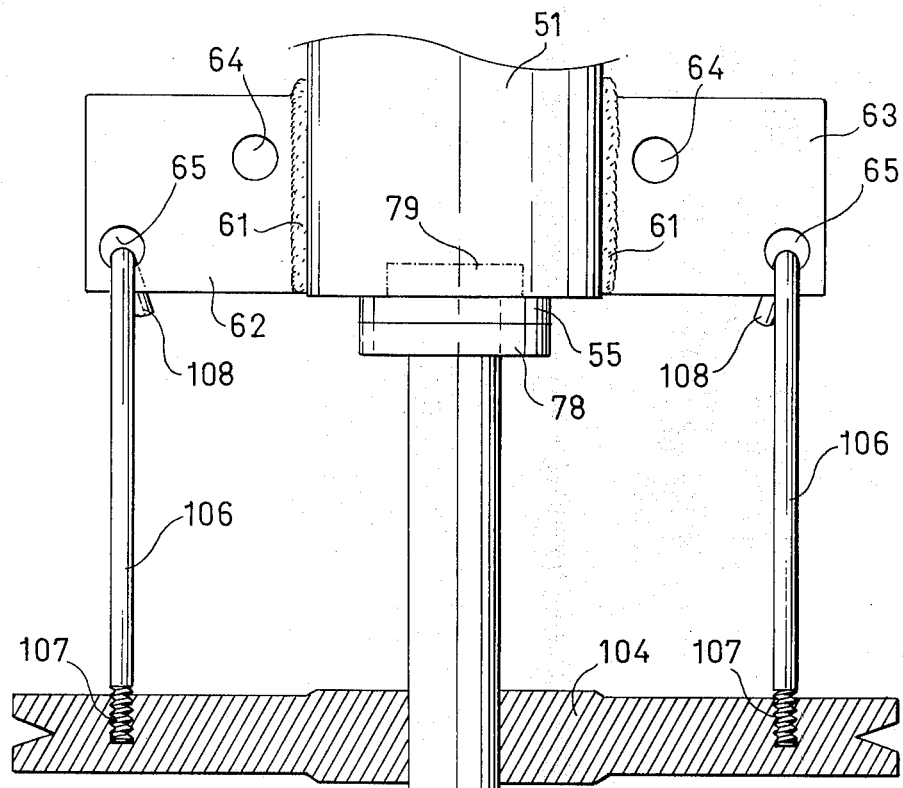
FIG. 13 is a somewhat simplified diagram illustrating the use of the tool shown in FIGS. 5 and 6 for removing a pulley wheel from a shaft.

In FIG. 13, there is illustrated somewhat schematically the use of the tool 50 for removing a pulley wheel 104 from a shaft 105. For this purpose, the tool 50 is used in conjunction with two arms 106 which are formed at their lower ends with threaded portions 107 which are screwed into threaded bores in the pulley wheel 104. At their upper ends, the arms 106 are formed with hook-like portions 108 which, in use, are inserted in the outer lower bores in the ears 62 and 63. In such use of the tool 50, the thrust plate 78 is once again utilized to allow the application of axial pressure to the shaft 105 as will be readily understood from FIG. 13.

Figure 14:
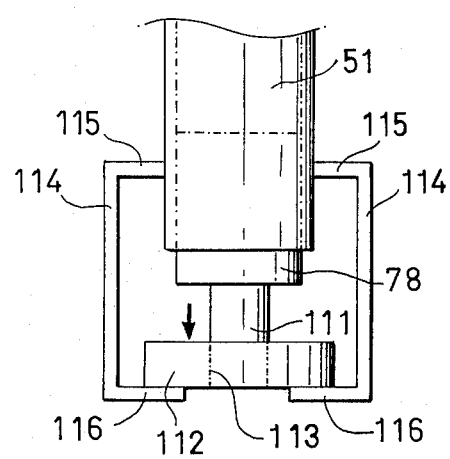
FIG. 14 is a schematic diagram illustrating the use of a tool in accordance with this invention for inserting a male member into a female member.

It will now be understood that the uses of the tool 50 as hereinbefore described with reference to FIGS. 6, 11 and 13 of the accompanying drawings all involve the pushing of a male member out of a female member. FIG. 14 shows somewhat schematically the alternative use of the tool 50 with the thrust plate 78 for press fitting or inserting a male member 111 into a bore 113 provided in a female member 112. It will be noted that the tool is shown somewhat schematically in FIG. 14 as being provided with arms 114 connected to ears 115 on the cylinder 51 and carrying at their lower ends a seating 116. If the shaft 105 of FIG. 13 or male member 111 of FIG. 14 is too long, then the thrust plate 78 can simply be removed, allowing the shaft to enter the blind bore in the piston. This also assists in guiding the shaft and holding it straight during the application of pressure.

Figure 15:
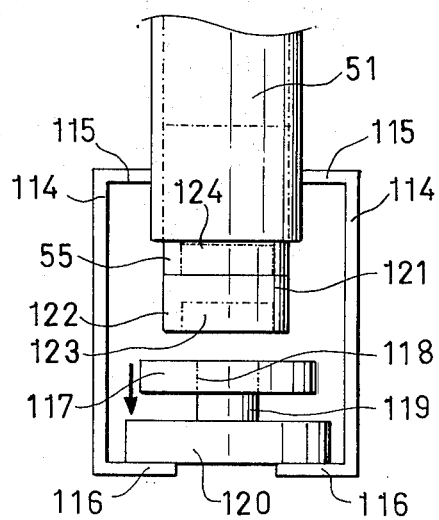
FIG. 15 is another schematic diagram illustrating the use of the same tool for pressing a female member onto a male member, and, FIG. 16 is another schematic diagram illustrating the use of the tool for pushing a female member off a male member.

In a similar schematic manner, FIG. 15 illustrates the use of the tool 50 for press fitting a female member 117 having an axial bore 118 onto an upstanding shaft or male member 119 projecting from a disc 120. For this purpose, instead of the thrust plate 78, there is used a different thrust plate 121 having an annular wall 122 defining an axial recess 123 and an axial stud 124. In use, the undersurface of the wall 122 engages the female member 117, the shaft or male member 119 then entering the recess 123 during such press fitting.

It will of course be appreciated that where shaft 119 is longer and the member 117 must be forced further onto it such recess 123 will be deeper. Alternatively, the thrust plate 121 can be provided with a through bore, i.e. an extension of recess 123. A further alternative is simply to omit thrust plate 121, and allow the shaft to enter the open lower end 55a of piston 55. One such application would be the fitting of a new ball joint housing 31 down over shaft 81a after removal of the old housing 81 as shown in FIG. 11.

Figure 16:
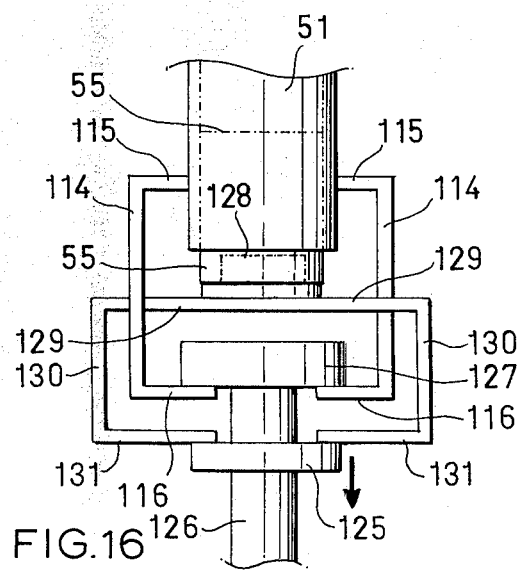

Finally, reference will be made to FIG. 16 which illustrates also schematically the use of the tool 50 for the press removal of a female member or collar 125 from a shaft 126 terminating in a head 127. For such an operation, the head 127 is supported on the seating 116 secured to the arms 114. A locating stud 128 carrying outwardly extending members 129 is disposed within the lower end of the piston 55. The diametrically opposed and radially extending members 129 are secured to downwardly extending arms 130 which are in turn provided at their lower ends with inwardly projecting feet 131 for engaging the top surface of the collar 125. On downward movement of the piston 55, the head 127 of the male member is held in position on the seating 116 while the female member or collar 125 is pushed downwardly off the shaft 126 by the feet 131.

Having completed the specific description herein of the construction and use of several embodiments of a multifunction tool as provided by this invention, it should perhaps be stressed that the invention is in no way restricted to those specific embodiments but embraces numerous variations in and modifications of the described structure.

What is claimed is:

1. A multi-function hydraulic tool which comprises:
   a hydraulic cylinder having a peripheral wall, an open end and a closed end;
   a piston having outer and inner ends and slidably mounted in said cylinder for movement in an axial direction between extended and retracted positions thereof;
   a port in fluid communication with the interior of said cylinder for the supply thereinto of a hydraulic fluid under pressure to cause axial outward movement of said piston through said open end of said cylinder toward said extended position thereof and for the discharge of such hydraulic fluid from within said cylinder on movement of said piston axially into said cylinder toward said retracted position thereof;
   arm means secured to said cylinder and projecting axially outwardly beyond said open end thereof;
   generally semi-circular annular seating means secured to said arm means in axially spaced apart position relative to said open end of said cylinder for supporting a first member when terminal pressure is applied by said piston against a cooperating second member so in turn to cause relative movement of said first and second members;
   a blind bore formed axially in said piston opening at said outer end and having a smooth regular inner surface;
   a thrust member adapted to be positioned at said outer end of said piston, and,
   guide stud means on said thrust member having a smooth regular outer surface dimensioned to make a sliding fit in said blind bore.

2. A multi-function hydraulic tool as claimed in claim 1 and in which said arm means is releasably secured to said cylinder.

3. A multi-function hydraulic tool as claimed in claim 2 and which additionally comprises arm-engaging means on said cylinder for releasable engagement with cooperating engaging means on said arm means.

4. A multi-function hydraulic tool as claimed in claim 3 and in which said arm-engaging means comprises a member projecting radially outwardly from said cylinder.

5. A multi-function hydraulic tool as claimed in claim 1, in which said arm means comprises two arms secured to said cylinder in peripherally spaced apart positions thereon and projecting axially outwardly beyond said open end thereof and including two said seating means one being secured to each said arm and being complementary to one another whereby to form an annular seating for reception of a said first part of generally circular shape thereon.

6. A multi-function hydraulic tool as claimed in claim 5, and in which said arms are secured to said cylinder in diametrically opposed positions thereon.

7. A multi-function hydraulic tool as claimed in claim 6 and in which both said arms are releasably secured to said cylinder.

8. A multi-function hydraulic tool as claimed in claim 1 and which additionally comprises limit means adapted to prevent axial outward movement of said piston beyond said extended position thereof.

9. A multi-function hydraulic tool as claimed in claim 8 and in which said limit means comprises an annular peripheral outward projection on said piston and a stop member removably mounted on said peripheral wall of said cylinder generally at said open end thereof for abutment by said projecting on said piston on movement of said piston into said extended position thereof.

10. A multi-function hydraulic tool as claimed in claim 1 and in which said seating means has a generally semi-circular annular transverse inner face opposing said open end of said cylinder and a generally semi-circular annular wall member surrounding said inner face for retaining said first member thereon.

11. A multi-function hydraulic tool as claimed in claim 10, and in which said inner face of said seating means is disposed in a plane perpendicular to said axial direction and in which said outer face of said seating means has a generally frusto-conical configuration tapering radially inwardly toward said inner face.

12. A multi-function hydraulic tool as claimed in claim 1 and in which said thrust member is formed with an axially outwardly projecting annular rim.

13. A multi-function hydraulic tool as claimed in claim 1 and in which said thrust member is formed with axially outwardly projecting arms terminating axially beyond said seating for engagement with a said second member.

14. A multi-function hydraulic tool which comprises:
a hydraulic cylinder having a peripheral wall, an open end and a closed end;
a piston having an outer end and slidably mounted in said cylinder for movement in an axial direction between extended and retracted positions thereof;
a blind bore in the outer end of said piston;
a port in fluid communication with the interior of said cylinder for the supply thereinto of a hydraulic fluid under pressure to cause axial outward movement of said piston through said open end of said cylinder toward said extended position thereof and for the discharge of such hydraulic fluid from within said cylinder on movement of said piston axially into said cylinder toward said retracted position thereof;
arm means secured to said cylinder and projecting axially outwardly beyond said open end thereof;
seating means secured to said arm means in axially spaced apart position relative to said open end of said cylinder for supporting a first member when terminal pressure is applied by said piston against a cooperating second member so in turn to cause relative movement of said first and second members;
anvil means adapted to be supported on said seating means, and,
tool means having cutting edge means facing said anvil means and a guide stud at the other end adapted to be slidably received in said blind bore.

15. A multi-function hydraulic tool as claimed in claim 14 wherein said anvil means is a disc-like plate dimensioned to be received in said seating means.

16. A multi-function hydraulic tool as claimed in claim 15 wherein said disc-like plate incorporates opening means therethrough.

17. A multi-function hydraulic tool as claimed in claim 14 wherein said tool means incorporates an annular flange therearound.

18. A multi-function hydraulic tool as claimed in claim 14 wherein said tool means incorporates a generally cylindrical extension at its working end, said cutting edge means being formed by removing portions of said extension to provide two radially extending cutting edges.

19. A multi-function hydraulic tool as claimed in claim 1 wherein said thrust member incorporates a blind bore for reception therein of a portion of a workpiece.

* * * * *